Patented May 29, 1945

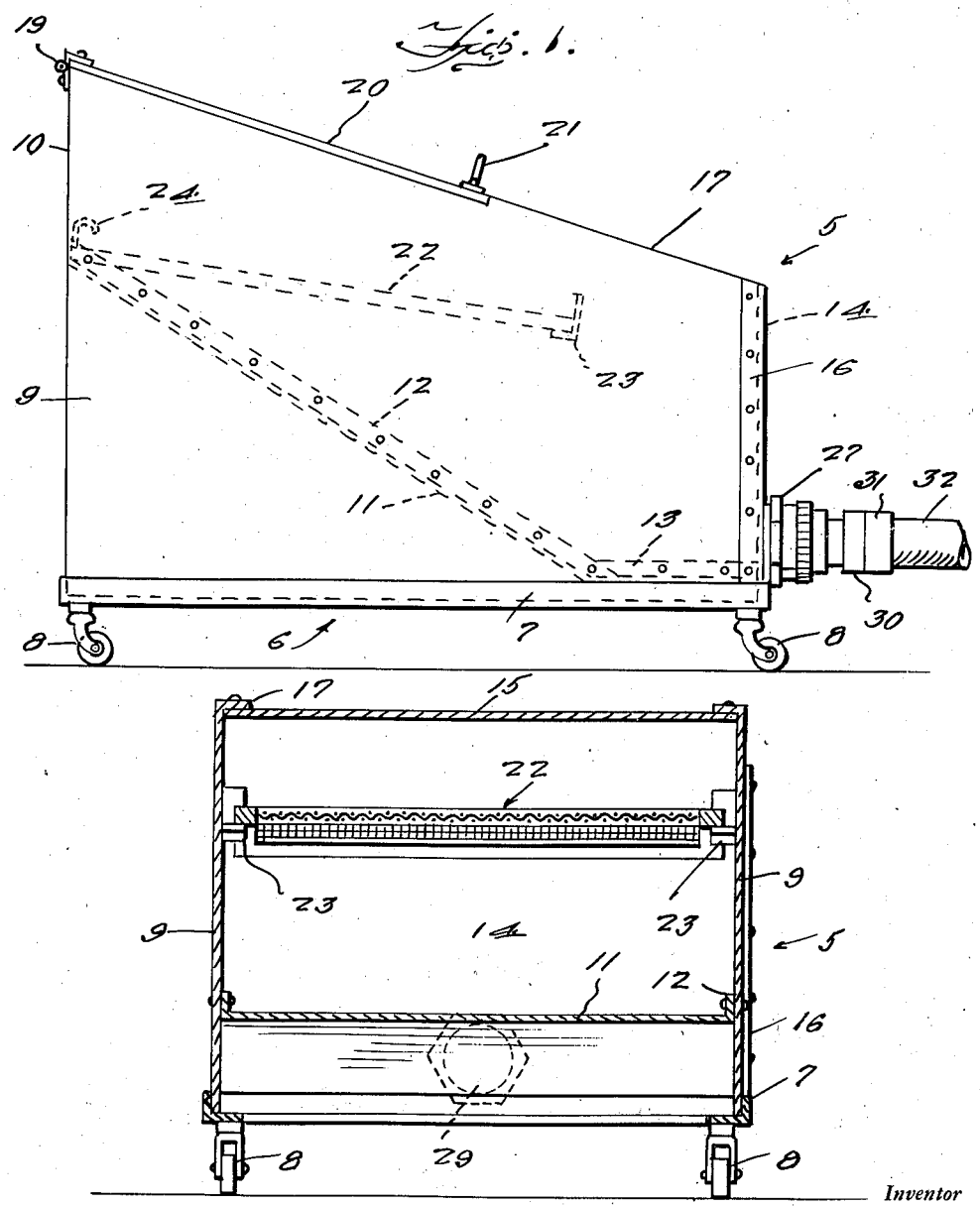

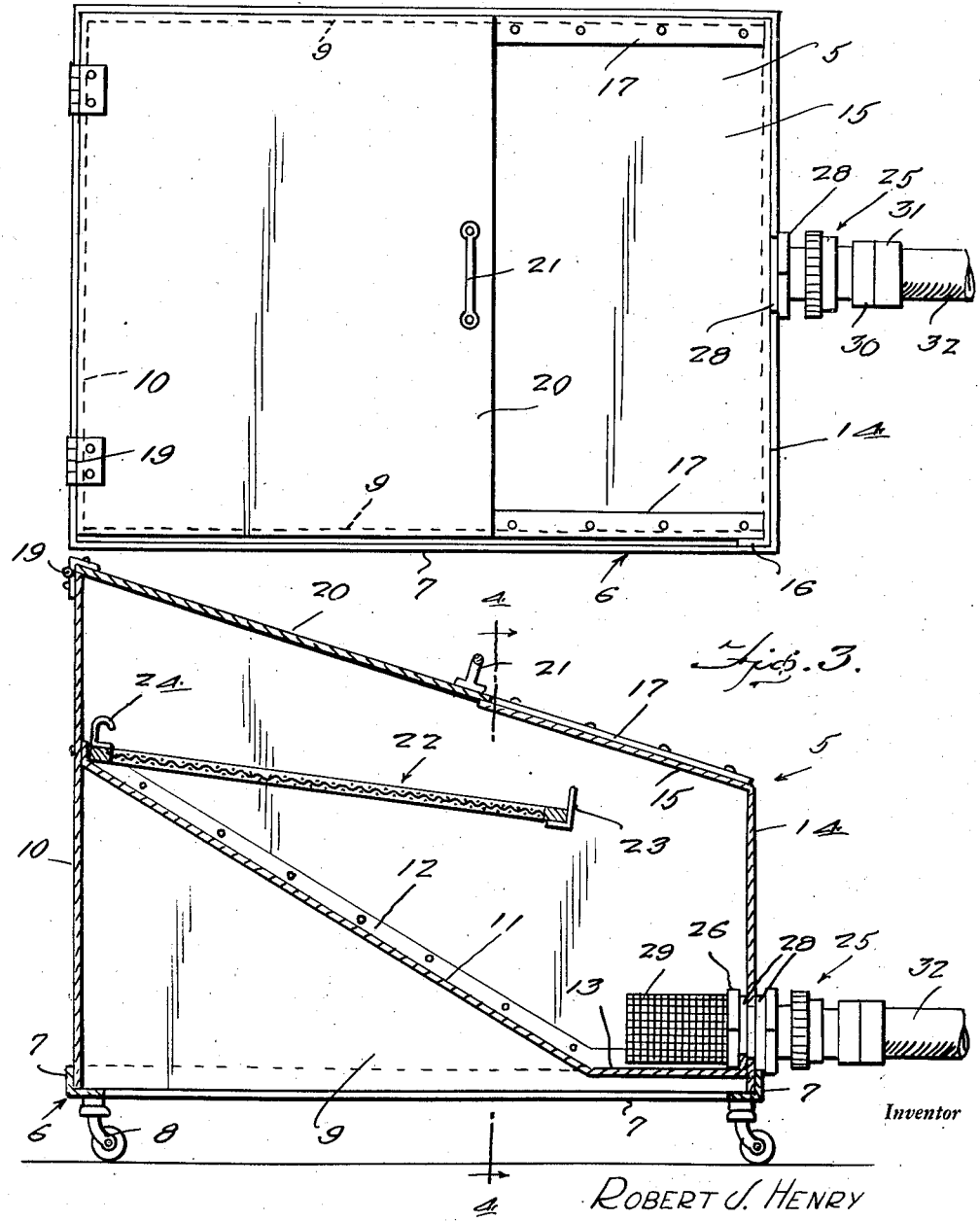

2,376,874

UNITED STATES PATENT OFFICE 2,376,874

AIRPLANE FUEL TANK DRAINING AND TRANSFERRING DEVICE

Robert J. Henry, Hanover, Pa., assignor of one-half to Louis Goldstein, Roxbury, Mass.

Application November 2, 1943, Serial No. 508,765

3 Claims. (Cl. 210—155)

This invention relates to a highly useful and practical device especially constructed to serve as a ways and means of expeditiously draining gasoline from the fuel tank of an airplane and then facilitating its transference and return to a truck tank, said device being appropriately useful when a leak in the fuel tank has been discovered and it is desired to then empty said tank and put it back in the truck tank or an equivalent storage receiver for subsequent usage.

Pursuant to proper fulfillment of my aim, I have accomplished what is desired through the adoption and use of a portable gasoline-receiving and transferring tanks, the same being characterized by a portable structure having an inclined false bottom forming a gravity chute, an associated screen constituting a baffle and minimizing splashing, the structure being further provided with a strainer equipped outlet constructed to accommodate a suction hose leading to the final storage or truck tank.

Further, and in carrying out my aim, I have adopted for use a simple and expedient portable tank construction characterized by strength and durability and embodying a simplified coordination of features coacting in a manner to attain efficient and desired results, whereby to make it possible to completely dispense with the somewhat slow and comparatively primitive bucket system now commonly in vogue.

Other features and advantages will become more readily apparent from the following description and accompanying illustrative drawings.

In the drawings, wherein like numerals are employed to designate like parts throughout the same:

Figure 1 is a side elevation of an airplane fuel tank straining and transferring portable tank structure constructed in accordance with the principles of the present invention.

Figure 2 is a top plan view of the structure seen in Figure 1.

Figure 3 is a central vertical or longitudinal sectional view with certain parts in elevation.

Figure 4 is a transverse vertical section taken on the plane of the line 4—4 of Figure 3, looking in the direction of the arrows.

The gasoline-receiving and transferring tank unit is denoted by the numeral 5, this being removably seated in the angle iron frame of the portable truck 6. This part 6 comprises a frame 7 made from adjoining angle irons, said frame being provided with self-adjusting casters 8. The top portion of the tank unit 5 is inclined forwardly and downwardly. The major part or shell of the tank comprises a pair of parallel side walls 9 and a rear vertical wall 10. Mounted between the side walls is a partition 11 which, as shown in Figure 3, is inclined downwardly at the proper slope. The flanges 12 are secured to the intermediate portions of the side walls 7. This partition is in effect a false bottom and the frontal horizontal portion 13 functions somewhat as a pan. An end portion of one of said side walls extends across in front of the pan and forms the front vertical wall 14 and an extension portion 15 thereof forms a part of the top, this part 15 extending between coacting portions of the side walls 9, as brought out to advantage in Figure 3. The laterally bent flange 16 from the wall 14 is attached to the adjacent end portion of the adjacent wall 9. The walls 9 are also provided with inwardly bent lateral flanges 17 overlying and fastened to the top-forming extension 15. It is perhaps best that the parts 11, 12 and 13 be referred to as an insert mounted between predetermined portions of the parallel walls 9 with the inner end of the partitioning part 11 fastened to the intermediate portion of the vertical or connective wall 10.

Attached to the upper end of the vertical wall 10 by suitable hinges 19 is a lid or cover 20. This closes the open space between the wall 10 and the innermost end of the extension 15, as also brought out to advantage in Figure 3. This cover is provided with a suitable handle 21. It functions not only as a closing lid, but also as a windshield, since it is possible to manuever the truck 6 into a position beneath the fuel tank (not shown) of the airplane to shield off the wind on windy and inclement days.

I call attention now to the internal anti-splash and baffle means 22. This comprises a screen mounted in a rectangular frame, the frame resting at one end in L-shaped brackets 23. The screen is provided with a suitable handling and hanger bracket 24, it being desirable to remove said screen for drying and cleaning, as is obvious. It will be noted that the screen rests at its opposite left-hand end on the upper portion of the chute 11. The opposite end is supported in the bracket 23. The screen is inclined slightly and is of a length less than the tank 5. It occupies a position directly beneath the inlet opening, that is, the opening covered by the lid 20.

Suitable fittings 25 having internal and external clamping nuts 26 and 27 and packing rings 28 serve to provide the discharge or outlet means. A strainer 29 is on the inner end of said discharge. Appropriate coupling elements 30 and 31 serve to accommodate the hose 32, which hose leads to the truck tank (not shown) or other receiving and storage tank into which the gasoline is transferred for subsequent re-use.

As stated, this device 5 and its transporting truck 6 provide a novel arrangement to do away with the present slow and primitive bucket system. The tank 5 is shoved up underneath the discharge of the fuel tank on the airplane (not shown) and the gasoline is allowed to gravitate, in an obvious manner. The lid 20 serves as a windshield as well as a cover. The whole tank structure 5 sits removably in the truck structure 6. The screen 22 serves as an anti-splash unit or device and the main inclined part 11 of the partitioning or insert unit serves as a chute. The suction hose removes the gasoline thus collected in the tank 5 and transfers it to the storage tank on a truck in an obvious manner.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. In a structure of the class described, a tank including side walls and an intervening rear wall, a front wall and a top wall, an inclined false bottom connected with the front wall, said top wall terminating in spaced relation from the rear wall and defining an intake opening, a hinged cover closing said opening, a removable screen in said tank constituting an anti-splash device, discharge means mounted in the front wall, a strainer on said means, said strainer being located within the area of the tank, said discharge means being adapted to accommodate a suction hose in the manner and for the purposes described.

2. A portable airplane fuel draining and transferring device comprising a receiving and transporting tank and a wheel-supported base structure therefor, said tank being substantially rectangular and of comparatively great capacity and including a downwardly inclined top wall adapted to be shoved beneath the airplane fuel tank, said top having a comparatively large hole for quick drainage purposes, a lid hingedly mounted on the high end of the top for normally closing said hole, said lid being useful to assume a position resting against the fuel tank to serve as a wind shield, a strainer equipped discharge device at the lower portion of the front wall of the tank to accommodate a suction hose for withdrawing the collected fuel and transferring it to a suitable storage receptacle, and a slightly inclined, substantially horizontal screen on the interior of the tank directly beneath the top hole, this serving as an anti-splash device and facilitating smooth functioning of said device.

3. In an airplane fuel tank emergency draining and transferring device, a low-slung frame with casters attached to and depending therefrom and constituting a truck, a large capacity tank removably mounted on said truck, said tank being substantially rectangular in form, an insert in the bottom portion thereof comprising a partition, the major portion of said partition forming a chute and inclining from the rear wall toward the front wall, the remainder thereof being substantially horizontal and constituting a fuel levelling and distributing pan, said tank having a hinged lid-covered intake-opening in its top adjacent one end, an anti-splash screen in the tank directly beneath said opening, said screen having one end resting on the upper end of the insert and the other end supported in a slightly downwardly inclined position between the side walls of the tank, and a screened discharge suction hose accommodating device connected to the front wall at a point just above said pan.

ROBERT J. HENRY.